US012769604B2

(12) United States Patent
Kulakovsky et al.

(10) Patent No.: US 12,769,604 B2
(45) Date of Patent: *Oct. 20, 2026

(54) MACHINE LEARNING-BASED GENERATION OF ALERT BUNDLE SELF-HEALING POLICIES FOR STORAGE SYSTEMS

(71) Applicant: Dell Products L.P., Round Rock, TX (US)

(72) Inventors: Alex Kulakovsky, Ra'anana (IL); Osnat Shasha, Holon (IL); Ophir Buchman, Raanana (IL)

(73) Assignee: Dell Products L.P., Round Rock, TX (US)

( * ) Notice: Subject to any disclaimer, the term of this patent is extended or adjusted under 35 U.S.C. 154(b) by 101 days.

This patent is subject to a terminal disclaimer.

(21) Appl. No.: 18/796,632

(22) Filed: Aug. 7, 2024

(65) Prior Publication Data

US 2026/0044401 A1 Feb. 12, 2026

(51) Int. Cl.
*G06F 11/07* (2006.01)
*G06F 11/20* (2006.01)
(Continued)

(52) U.S. Cl.
CPC .......... *G06F 11/079* (2013.01); *G06F 11/073* (2013.01); *G06F 11/0769* (2013.01);
(Continued)

(58) Field of Classification Search
CPC .. G06F 11/079; G06F 11/073; G06F 11/0769; G06F 11/20; G06F 11/2094; G06F 11/201; G06N 3/092
See application file for complete search history.

(56) References Cited

U.S. PATENT DOCUMENTS 6,725,392 B1 * 4/2004 Frey .................... G06F 11/1076
714/E11.034
9,081,828 B1 * 7/2015 Martin .................. G06F 11/008
(Continued)

OTHER PUBLICATIONS

L. Chen et al., "Decision Transformer: Reinforcement Learning via Sequence Modeling," arXiv:2106.01345v2, Jun. 24, 2021, 21 pages.
(Continued)

*Primary Examiner* — Jonathan D Gibson
(74) *Attorney, Agent, or Firm* — Ryan, Mason & Lewis, LLP

(57) ABSTRACT

An apparatus comprises at least one processing device configured to determine information characterizing alerts detected on a set of storage systems, the determined information characterizing (i) times at which the alerts are raised and cleared, (ii) times at which recovery actions are taken, and (iii) system state information before and after the recovery actions. The at least one processing device is also configured to generate, utilizing one or more machine learning algorithms that take as input at least a portion of the determined information, an alert bundle self-healing policy for a given set of alerts, the alert bundle self-healing policy identifying a root cause alert and at least one recovery action to take in response to the root cause alert to remediate the given set of alerts. The at least one processing device is further configured to provision the alert bundle self-healing policy in storage controllers of the storage systems.

20 Claims, 8 Drawing Sheets

(51) Int. Cl.
*G06N 3/092* (2023.01)
*G06F 11/16* (2006.01)
*G06N 20/00* (2019.01)

(52) U.S. Cl.
CPC .......... *G06F 11/20* (2013.01); *G06F 11/2005* (2013.01); *G06F 11/2007* (2013.01); *G06F 11/201* (2013.01); *G06N 3/092* (2023.01); *G06F 11/1616* (2013.01); *G06N 20/00* (2019.01)

(56) References Cited

U.S. PATENT DOCUMENTS 10,289,507 B1* 5/2019 Malwankar ........... G06F 3/0632
11,481,310 B1* 10/2022 Panchev ............. G06F 11/0793
12,253,904 B2* 3/2025 Shasha ................ G06F 11/0727
12,399,767 B1* 8/2025 Breitenbach ........ G06F 11/0709
2005/0193231 A1* 9/2005 Scheuren ............ H04L 67/1097 714/5.1
2012/0124410 A1* 5/2012 Chun .................. G06F 11/0736 714/2
2013/0055290 A1* 2/2013 Gaikwad ............. G06F 11/1443 719/326
2013/0097130 A1* 4/2013 Bingol .................. G06F 16/273 707/694
2014/0372805 A1* 12/2014 Rijnders ............. H04L 41/5074 714/37
2016/0011950 A1* 1/2016 Caradonna .......... G06F 11/2094 714/6.3
2016/0359923 A1* 12/2016 Chen ...................... G06N 20/00
2017/0091050 A1* 3/2017 Mohammad ........... G06Q 30/02
2017/0123886 A1* 5/2017 Vaideeswaran ..... G06F 11/0727
2017/0134237 A1* 5/2017 Yang ................... H04L 41/0897
2017/0315879 A1* 11/2017 Park .................... G06F 11/0727
2018/0210778 A1* 7/2018 Das ..................... G06F 11/0727
2019/0087253 A1* 3/2019 Li ....................... G06F 11/3072
2019/0243703 A1* 8/2019 Rooney ............... G06F 11/2056
2019/0342146 A1* 11/2019 Magcale ................. H04L 43/04
2020/0042390 A1* 2/2020 Roberts ............... G06F 11/1092
2020/0151060 A1* 5/2020 Rinaldi ............... G06F 11/2048
2020/0151065 A1* 5/2020 Rinaldi ............... G06F 11/2089
2020/0174972 A1* 6/2020 Ranjan ................ G06F 11/0787
2020/0252264 A1* 8/2020 Arora .................. H04L 43/0817
2021/0042180 A1* 2/2021 Sutton ................. G06F 11/0727
2021/0349780 A1* 11/2021 Ki ....................... G06F 11/1092
2021/0349782 A1* 11/2021 Ki ......................... G06F 11/165
2021/0377106 A1* 12/2021 Ledbetter ............ H04L 41/0686
2022/0129156 A1* 4/2022 Twohig ................. G06F 3/0605
2022/0237069 A1* 7/2022 Freeman ............. G06F 11/3409
2023/0118188 A1* 4/2023 Arora .................. G06F 11/0709 714/4.1
2023/0195577 A1* 6/2023 Darnell ............... G06F 11/2048 714/15
2023/0205647 A1* 6/2023 Sharma ............... G06F 11/2025 714/15
2023/0281073 A1* 9/2023 Shachar ................. G06N 5/025 714/25
2023/0333621 A1* 10/2023 Han .................... G06F 11/1417
2024/0070012 A1* 2/2024 Baldassarre ........ G06F 11/2025
2024/0160517 A1* 5/2024 Fischer ............... G06F 11/0769
2024/0296086 A1* 9/2024 Bonam ............... G06F 11/0721
2025/0021419 A1* 1/2025 Shasha ................ G06F 11/0727
2026/0044401 A1* 2/2026 Kulakovsky .......... G06F 11/079

OTHER PUBLICATIONS

Dell Technologies, "Dell PowerStore: Introduction to the Platform," H18149.13, White Paper, May 2024, 43 pages.

K. Demochkin, "Decision Transformer Explained," https://www.casualganpapers.com/sequence-modeling-reinforcement-learning-transformers/DecisionTransformer.html, Jun. 9, 2021, 7 pages.

Dell Technologies, "Dell PowerStore," Specification Sheet, May 2024, 9 pages.

Dell Technologies, "Dell PowerStore Storage Family," Specification Sheet, Sep. 2023, 8 pages.

* cited by examiner

400

600

MACHINE LEARNING-BASED GENERATION OF ALERT BUNDLE SELF-HEALING POLICIES FOR STORAGE SYSTEMS

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for IO operations. In some information processing systems, multiple storage systems may be used to form a storage cluster.

SUMMARY

Illustrative embodiments of the present disclosure provide techniques for machine learning-based generation of alert bundle self-healing policies for sets of alerts encountered on storage systems.

In one embodiment, an apparatus comprises at least one processing device comprising a processor coupled to a memory. The at least one processing device is configured to determine information characterizing a plurality of alerts detected on a set of two or more storage systems, the determined information characterizing (i) times at which the plurality of alerts are at least one of raised and cleared on the set of two or more storage systems, (ii) times at which one or more recovery actions are taken on the set of two or more storage systems, and (iii) system state information for respective ones of the storage systems in the set of two or more storage systems before and after the one or more recovery actions. The at least one processing device is also configured to generate, utilizing one or more machine learning algorithms that take as input at least a portion of the determined information, an alert bundle self-healing policy for a given set of alerts in the plurality of alerts, the alert bundle self-healing policy identifying a root cause alert in the given set of alerts and at least one recovery action to take in response to the root cause alert to remediate the given set of alerts. The at least one processing device is further configured to provision at least one or more portions of the alert bundle self-healing policy in storage controllers of each of the two or more storage systems.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
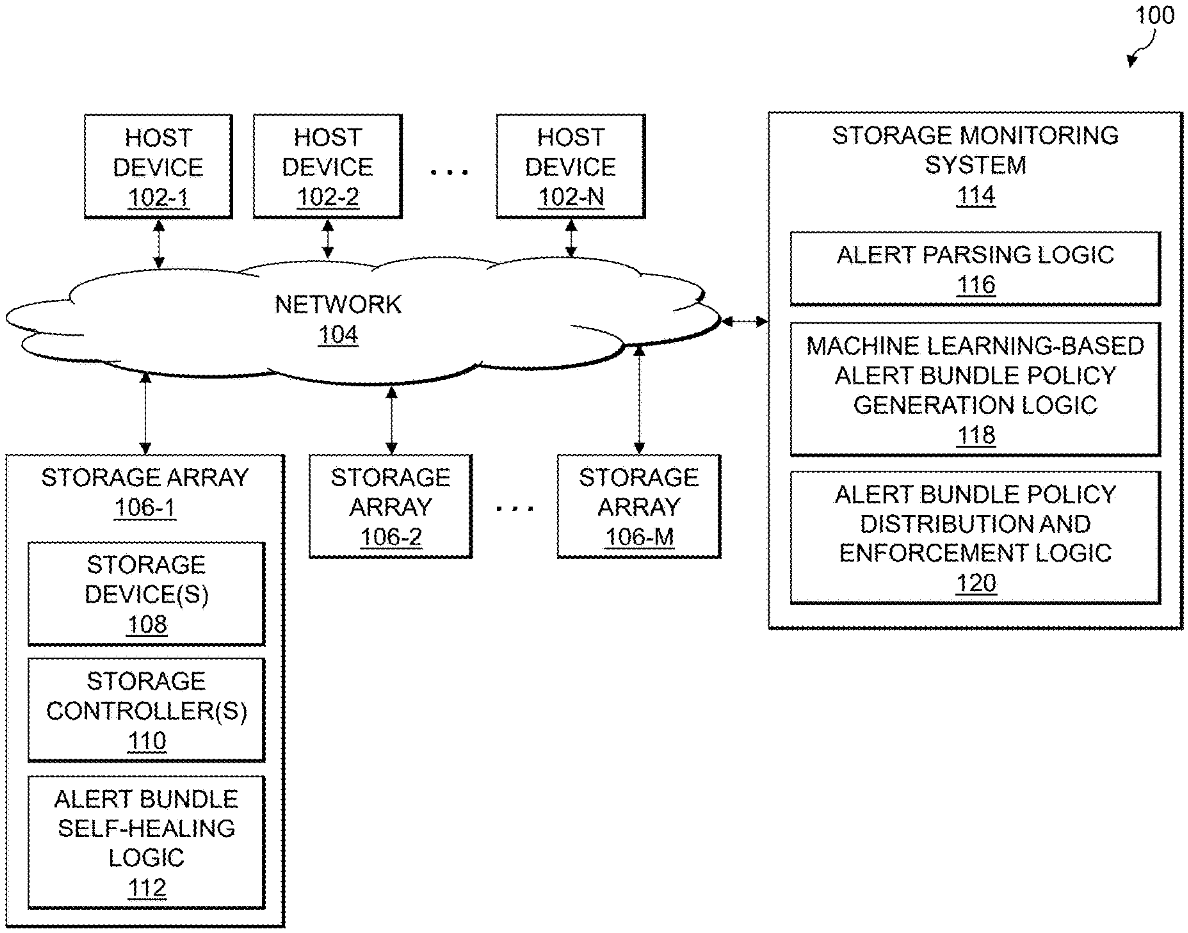
FIG. 1 is a block diagram of an information processing system configured for machine learning-based generation of alert bundle self-healing policies for sets of alerts encountered on storage systems in an illustrative embodiment.

FIG. 1 shows an information processing system 100 configured in accordance with an illustrative embodiment to provide functionality for machine learning-based generation of alert bundle self-healing policies for sets of alerts encountered on storage systems. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system. In some embodiments, the storage arrays 106 may be part of a storage cluster (e.g., where the storage arrays 106 may be used to implement one or more storage nodes in a cluster storage system comprising a plurality of storage nodes interconnected by one or more networks), and the host devices 102 are assumed to submit IO operations to be processed by the storage cluster.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

At least one of the storage controllers of the storage arrays 106 (e.g., the storage controller 110 of storage array 106-1) is assumed to implement functionality for alert bundling for its associated one of the storage arrays 106. Such functionality is provided via alert bundle self-healing logic 112, which is configured to detect bundles of alerts raised by the storage controllers 110 (e.g., one or more baseboard management controllers (BMCs), one or more remote access controllers such as one or more instances of an Integrated Dell Remote Access Controller (iDRAC), etc.). If the bundle of alerts is "known" (e.g., is associated with an existing alert bundle self-healing policy specifying one or more corrective or self-healing actions to take), then the alert bundle self-healing logic 112 applies the one or more corrective or self-healing actions specified in its associated existing alert bundle self-healing policy. If the bundle of alerts is new or "unknown" (e.g., it is not associated with any existing alert bundle self-healing policy), then the alert bundle self-healing logic 112 may attempt a designated number of recovery actions in an attempt to improve the storage system health. The alert bundle self-healing logic 112 may also upload or otherwise provide to a storage monitoring system 114 the new or unknown bundle of alerts and associated information (e.g., system configuration information and information related to the attempted recovery actions and system state before and after the attempted recovery actions).

The storage monitoring system 114 implements alert parsing logic 116, machine learning-based alert bundle policy generation logic 118, and alert bundle policy distribution and enforcement logic 120. The alert parsing logic 116 is configured to receive, from the alert bundle self-healing logic 112 of the storage array 106-1 (and possibly other instances of alert bundle self-healing logic implemented by other ones of the storage arrays 106-2 through 106-M), the new or unknown sets of alerts and associated information (e.g., system configuration information and information related to the attempted recovery actions and system state before and after the attempted recovery actions). The machine learning-based alert bundle policy generation logic 118 analyzes such information using one or more machine learning algorithms in order to generate new or refined alert bundle self-healing policies. The machine learning-based alert bundle policy generation logic 118, in some embodiments, may implement a reinforcement learning (RL) framework utilizing a decision transformer (DT) architecture. The alert bundle policy distribution and enforcement logic 120 is configured to distribute the new or refined alert bundle self-healing policies to instances of the alert bundle self-healing logic 112 on each of the storage arrays 106.

In some embodiments, the storage arrays 106 in the FIG. 1 embodiment provide or implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

It should be appreciated that a multi-tier storage system may include more than two storage tiers, such as one or more "performance" tiers and one or more "capacity" tiers, where the performance tiers illustratively provide increased IO performance characteristics relative to the capacity tiers and the capacity tiers are illustratively implemented using relatively lower cost storage than the performance tiers. There may also be multiple performance tiers, each providing a different level of service or performance as desired, or multiple capacity tiers.

Although in the FIG. 1 embodiment the alert bundle self-healing logic 112 is shown as being implemented internal to the storage array 106-1 and outside the storage controllers 110, in other embodiments the alert bundle self-healing logic 112 may be implemented at least partially internal to the storage controllers 110 or at least partially outside the storage array 106-1, such as on one of the host devices 102, one or more other ones of the storage arrays 106-2 through 106-M, on one or more servers external to the host devices 102 and the storage arrays 106 (e.g., including on a cloud computing platform or other type of information technology (IT) infrastructure), etc. Further, although not shown in FIG. 1, other ones of the storage arrays 106-2 through 106-M may implement respective instances of the alert bundle self-healing logic 112. In addition, although the storage monitoring system 114 is shown as being implemented external to the storage arrays 106 and the host devices 102, this is not a requirement. The storage monitoring system 114, or one or more components thereof (e.g., the alert parsing logic 116, the machine learning-based alert bundle policy generation logic 118, and the alert bundle policy distribution and enforcement logic 120) may be implemented at least partially internal to one or more of the host devices 102 and/or one or more of the storage arrays 106.

At least portions of the functionality of the alert bundle self-healing logic 112, the alert parsing logic 116, the machine learning-based alert bundle policy generation logic 118, and the alert bundle policy distribution and enforcement logic 120 may be implemented at least in part in the form of software that is stored in memory and executed by a processor.

The host devices 102, the storage arrays 106 and the storage monitoring system 114 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102, the storage arrays 106 and the storage monitoring system 114 may be implemented on respective distinct processing platforms, although numerous other arrangements are possible. For example, in some embodiments at least portions of one or more of the host devices 102, one or more of the storage arrays 106 and/or the storage monitoring system 114 are implemented on the same processing platform. One or more of the storage arrays 106 can therefore be implemented at least in part within at least one processing platform that implements at least a subset of the host devices 102 and/or the storage monitoring system 114.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (ISCSI), Serial Attached SCSI (SAS) and Serial ATA (SATA). Numerous other interfaces and associated communication protocols can be used in other embodiments.

The storage arrays 106 in some embodiments may be implemented as part of a cloud-based system. The storage monitoring system 114 may also or alternatively be implemented as part of the cloud-based system.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 and the storage monitoring system 114 may be implemented at least in part in the first geographic location, the second geographic location, and one or more other geographic locations. Thus, it is possible in some implementations of the system 100 for different ones of the host devices 102, the storage arrays 106 and the storage monitoring system 114 to reside in different data centers.

Numerous other distributed implementations of the host devices 102, the storage arrays 106 and the storage monitoring system 114 are possible. Accordingly, the host devices 102, the storage arrays 106 and the storage monitoring system 114 can also be implemented in a distributed manner across multiple data centers.

Additional examples of processing platforms utilized to implement portions of the system 100 in illustrative embodiments will be described in more detail below in conjunction with FIGS. 7 and 8.

It is to be understood that the particular set of elements shown in FIG. 1 for machine learning-based generation of alert bundle self-healing policies for sets of alerts encountered on storage systems is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for machine learning-based generation of alert bundle self-healing policies for sets of alerts encountered on storage systems will now be described in more detail with reference to the flow diagram of FIG. 2. It is to be understood that this particular process is only an example, and that additional or alternative processes for machine learning-based generation of alert bundle self-healing policies for sets of alerts encountered on storage systems may be used in other embodiments.

In this embodiment, the process includes steps 200 through 204. These steps are assumed to be performed by one or more of the alert bundle self-healing logic 112, the alert parsing logic 116, the machine learning-based alert bundle policy generation logic 118 and the alert bundle policy distribution and enforcement logic 120. The process begins with step 200, determining information characterizing a plurality of alerts detected on a set of two or more storage systems. The determined information characterizes (i) times at which the plurality of alerts are at least one of raised and cleared on the set of two or more storage systems, (ii) times at which one or more recovery actions are taken on the set of two or more storage systems, and (iii) system state information for respective ones of the storage systems in the set of two or more storage systems before and after the one or more recovery actions. In some embodiments, at least a subset of the plurality of alerts are not associated with any existing alert bundle self-healing policies configured in the storage controllers of the set of two or more storage systems. The system state information may comprise a vector of discrete properties characterizing health of the set of two or more storage systems. The vector of discrete properties may specify numbers of the plurality of alerts which are at least one of raised and cleared on respective ones of the storage systems in the set of two or more storage systems.

In step 202, an alert bundle self-healing policy is generated, utilizing one or more machine learning algorithms that take as input at least a portion of the determined information, for a given set of alerts in the plurality of alerts. The alert bundle self-healing policy identifies a root cause alert in the given set of alerts and at least one recovery action to take in response to the root cause alert to remediate the given set of alerts. At least one or more portions of the alert bundle self-healing policy is provisioned in storage controllers of each of the two or more storage systems in step 204 (e.g., such that different portions of the alert bundle self-healing policy may be provisioned in different ones of the storage controllers, the entire alert bundle self-healing policy may be provisioned in each of at least a subset of the storage controllers, etc.). The alert bundle self-healing policy may comprise a new alert bundle self-healing policy, or a modification of an existing alert bundle self-healing policy configured in the storage controllers of the set of two or more storage systems.

In some embodiments, the alert bundle self-healing policy, when triggered, replaces reporting of the given set of alerts with reporting of the root cause alert only. The alert bundle self-healing policy may specify a window of time, wherein reporting of ones of the given set of alerts raised in the specified window of time, other than the root cause alert, are masked. The given set of alerts may be determined based at least in part on identifying which of the plurality of alerts are cleared within a predefined window of time following the at least one recovery action that remediates the root cause alert. The given set of alerts may exclude one or more alerts in the plurality of alerts which are raised during the predefined window of time and which are not cleared within the predefined window of time following the at least one recovery action that remediates the root cause alert. The root cause alert for the alert bundle self-healing policy may be determined based at least in part on incident analysis for a set of support tickets generated by the set of two or more storage systems.

The one or more machine learning algorithms may comprise an RL framework utilizing a DT architecture. The DT architecture may be trained utilizing a random walk through one or more known sub-graphs characterizing transitions between system states as a result of recovery actions taken to bring storage systems from a starting state to a goal state. The RL framework may utilize a reward determined based at least in part on a difference in a health of the set of two or more storage systems determined by comparing the system state information before and after the one or more recovery actions to generate the alert bundle self-healing policy.

It should be noted that the term "data structure" as used herein is intended to be broadly construed. A data structure, such as any single one of or combination of the first and second data structures referred to above, may provide a portion of a larger data structure, or any one of or combination of the first and second data structures may be combinations of multiple smaller data structures. Therefore, the first and second data structures referred to above may be different parts of a same overall data structure, or one or more of the first and second data structures could be made up of multiple smaller data structures. The data structures may include tables, vectors, embeddings, or various other data structures. In some embodiments, the data structures are specifically formatted or generated such that they are suitable for use as at least one of an input to and an output from a machine learning model. It should further be appreciated that "generating" a data structure may encompass, for example, populating an existing or previously-created data structure with one or more data items.

Figure 2:
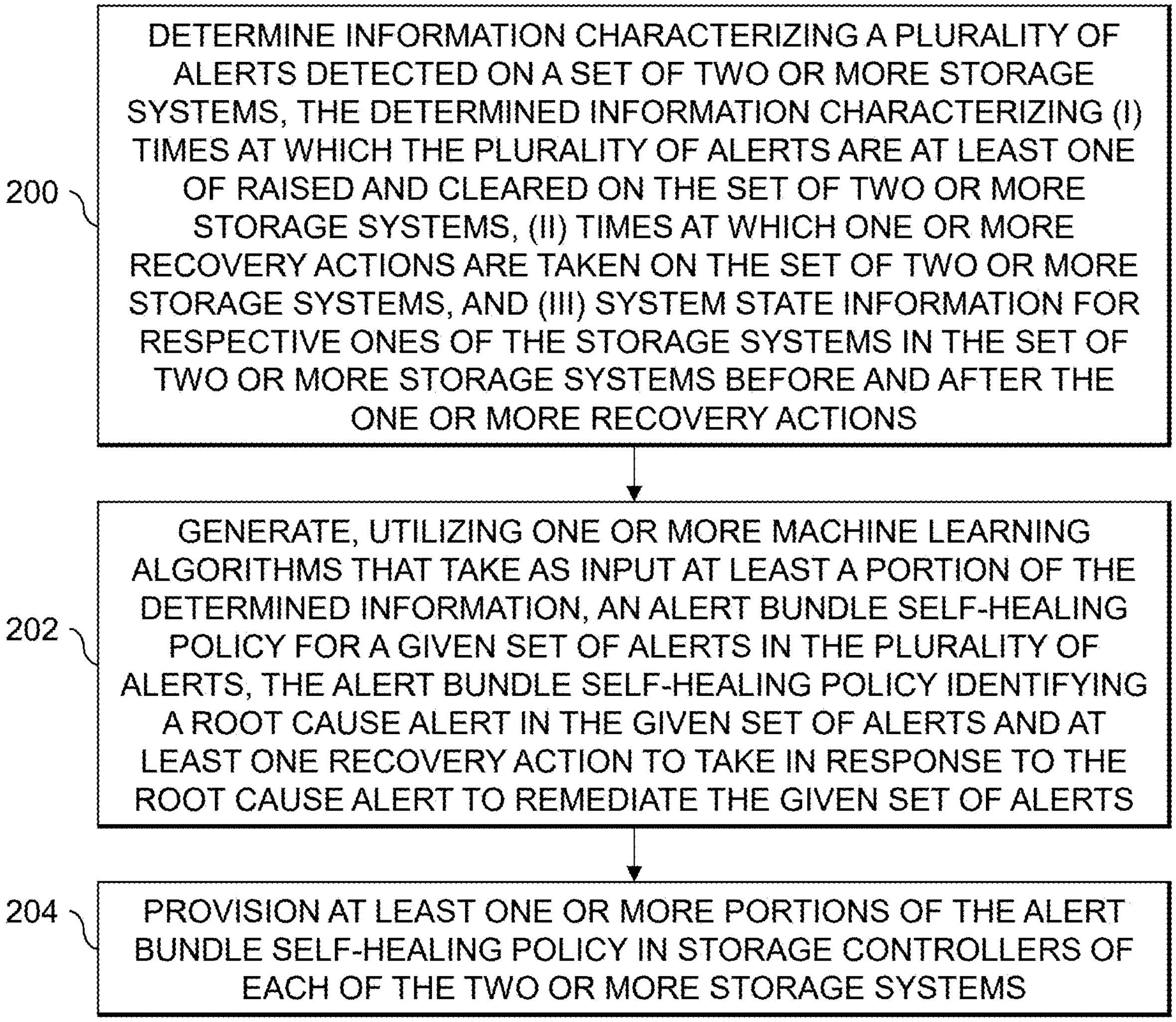
FIG. 2 is a flow diagram of an exemplary process for machine learning-based generation of alert bundle self-healing policies for sets of alerts encountered on storage systems in an illustrative embodiment.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes, etc.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Storage systems may utilize a distributed architecture, meaning that the storage systems include multiple individual software and hardware components working towards a same goal. The health of the components in the distributed storage system is consistently monitored and analyzed. If an unhealthy component or sub-component is detected, it results in the generation of numerous events or alerts. The alerts include indications of impact and proposed repair procedures. As multiple independent components generate independent events or alerts, a single underlying issue may lead to a flood of notifications (e.g., for each event or alert) that lack understanding of their interrelationships, context and sequence.

Consider, for example, a Dell PowerStore system which raises the following set of alerts: all storage controllers report that their left Power Supply Units (PSUs) are disconnected, leading to two alerts per PowerStore appliance; and all disk array enclosures report that their left PSUs were disconnected, leading to up to four alerts per PowerStore appliance. Thus, in a PowerStore system with just a single PowerStore appliance, six alerts may be generated. Root Cause Analysis (RCA) of such alerts may indicate that a power distribution unit (PDU) has lost power, and the recovery action plan would include checking the PDU's connectivity. In this example, six alerts may be raised for the same underlying issue. Such issues are exacerbated in more complex distributed storage systems. Conventional distributed storage systems lack logic which correlates between all components (e.g., such that only one alert would be generated that, if repaired, would result in the underlying problem being fixed). This kind of logic would need to be constantly maintained anytime a new event or alert is added. Testing such logic requires massive test cases to verify that the events and alerts correlation and masking are working properly.

Illustrative embodiments provide technical solutions that address correlation and masking between events or alerts in distributed storage systems or other types of IT infrastructure environments. In some embodiments, advanced algorithms are employed to analyze events or alerts for correlation and masking. All the events or alerts which are related to fixed problems may be aggregated from different components (e.g., different storage appliances or nodes in a distributed storage system) in the field, and may be stored in a unified database of a monitoring system (e.g., a storage monitoring system). The unified database provides inputs to the algorithm, which may be performed or otherwise run as a background process. The algorithm creates Event and Alert Bundle Rules (EABRs), which specify root cause alerts for each set of events or alerts. Thus, the technical solutions are able to "teach" components how to handle new EABRs without the need for version upgrades. Each of the components is configured with an infrastructure for maintaining EABRs. Each new set of events and alerts that the components generate due to a new problem is compared with the EABRs in its local database, using given windows provided by the different EABRs. If a set of events or alerts matches the rules in a given EABR, the component is configured to utilize the given EABR to indicate a root cause event or alert in the set of events or alerts, along with one or more recovery steps or other actions to be taken to remediate the underlying issues.

A system flow for analyzing and comprehending the correlation and masking between events or alerts will now be described in detail. The raising and clearing of events or alerts are analyzed based on monitoring multiple IT assets in an IT infrastructure environment (e.g., storage appliances or nodes of a distributed storage system). Specific examples may be analyzed utilizing a customer support case database, quality assurance (QA) lab testing, etc. The examples may be divided into groups based on various factors, such as software or hardware release or version, software or hardware type, software or hardware configuration, etc. Based on such analysis, event or alert bundles are identified. The boundaries of a given bundle of events or alerts may be determined based on the recovery—once a repair is done, alerts are cleared within a predefined window automatically and the system and its components states are improved. The boundaries of a given bundle of events or alerts may also be determined based on checking if the order of the events or alerts is meaningful. Any unrelated events or alerts are filtered out of the identified bundles. Such filtering may be based, for example, on detecting if alerts are still set after a repair is completed. Sometimes, additional events or alerts may indicate an additional problem which has no relation to the other events or alerts in a given one of the identified bundles. Next, the "root cause" event or alert in each of the identified bundles is determined via RCA. This may include incident analysis from related fields, QA or other support tickets (e.g., by hinting at a possible and likely RCA). Incident resolution steps are then identified for resolving the specific issues that are the causes of the events or alerts in each of the identified bundles. The incident resolution steps may be determined based on incident analysis, knowledge bases, etc. These bundles, with an identified root cause event or alert along with incident resolution steps, form EABRs.

Figure 3:
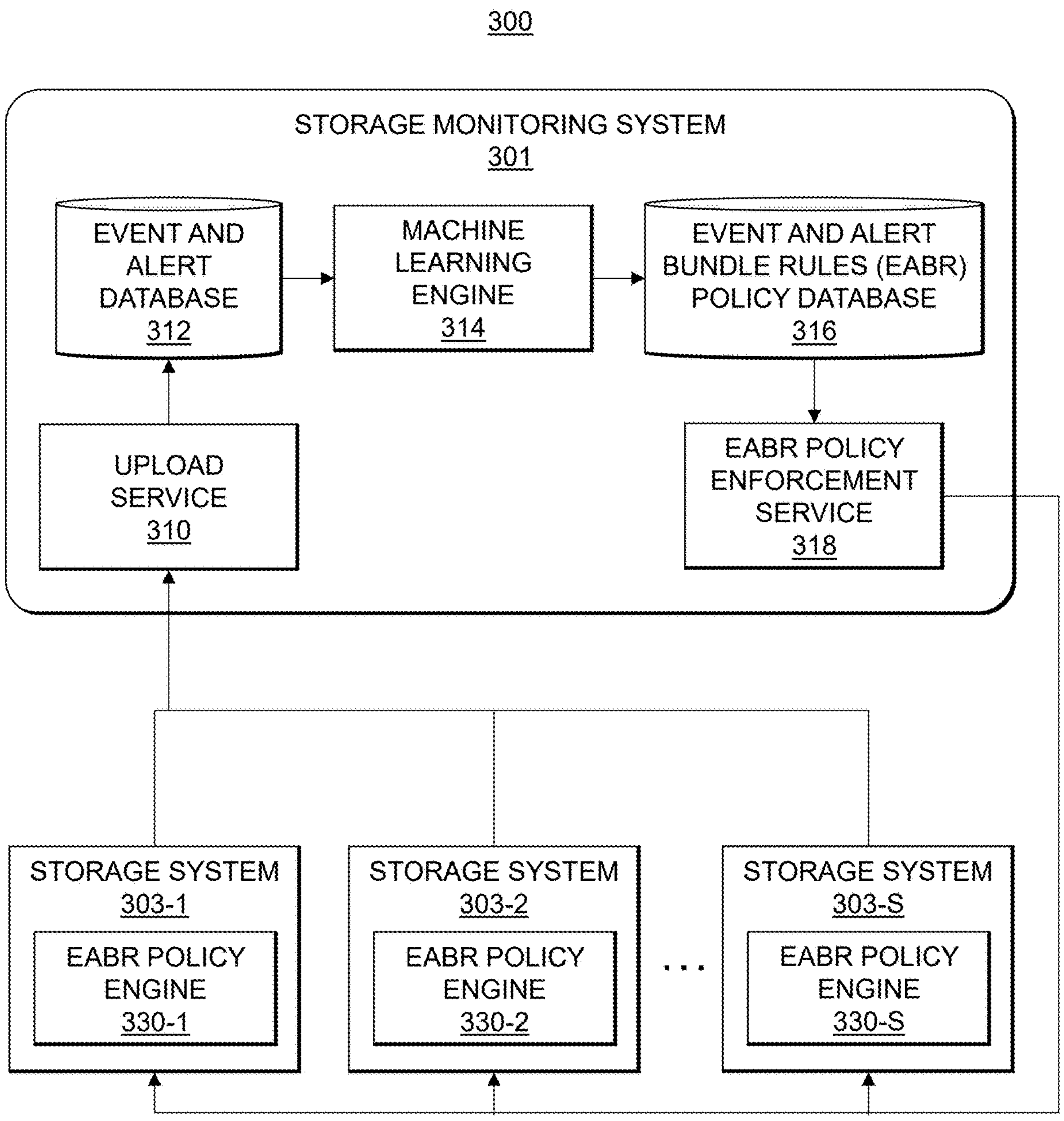
FIG. 3 shows a timeline of alerts which are raised and cleared in a distributed storage system in an illustrative embodiment.

FIG. 3 shows a system 300 including a storage monitoring system 301 implementing an upload service 310, an event and alert database 312, a machine learning engine 314, an EABR policy database 316, and an EABR policy enforcement service 318. The storage monitoring system 301 in the system 300 is responsible for propagating and enforcing EABR policies for a set of storage systems 303-1, 303-2, . . . 303-S (collectively, storage systems 303). The storage systems 303 may also be referred to as storage appliances. Each of the storage systems 303-1, 303-2, . . . 303-S implements an EABR policy engine 330-1, 330-2, . . . 330-S (collectively, EABR policy engines 330). The EABR policy engines 330 are configured to analyze events and alerts raised on the storage systems 303 to determine whether any EABR policies are triggered or matched. If so, the incident resolution steps specified in the matched EABR policies are implemented to self-heal or resolve the underlying issues (e.g., to recover from specific erroneous scenarios associated with different EABR policies). The EABR policy enforcement service 318 of the storage monitoring system 301 may propagate or otherwise distribute and update the EABR policies across the EABR policy engines 330.

Figure 4:
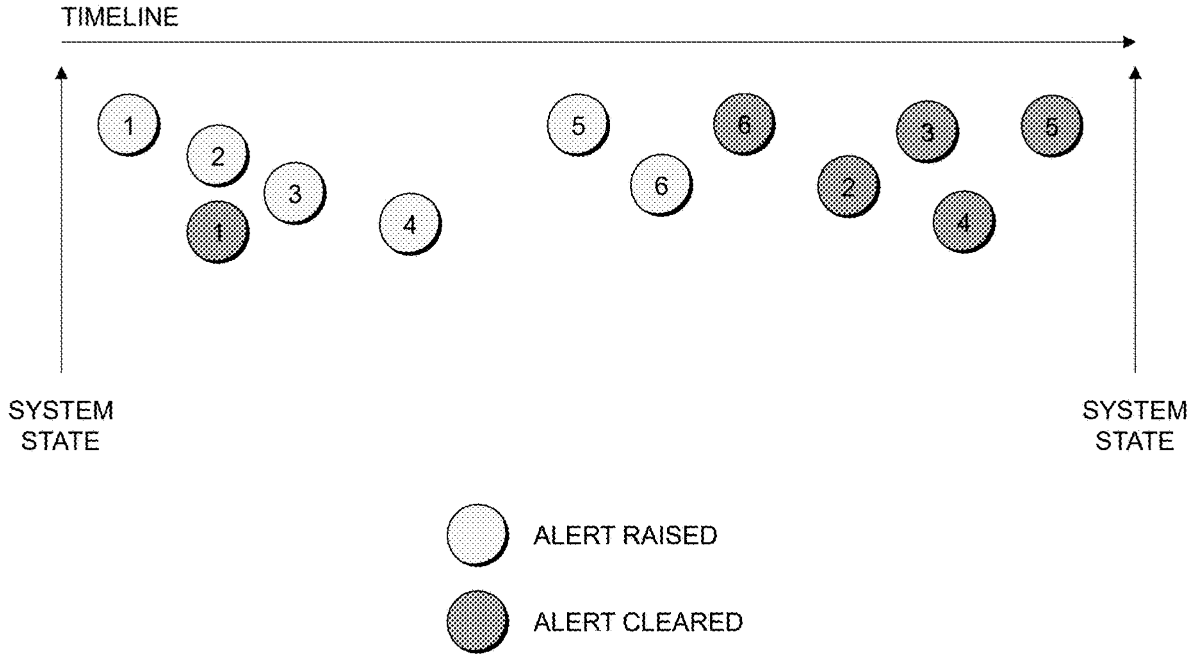
FIG. 4 shows a storage monitoring system configured for generating alert bundling policies for a set of managed storage systems in an illustrative embodiment.

The EABR policy engines 330 may also report, to the upload service 310 of the storage monitoring system 301, system state (e.g., system health) and system configuration information. The system state may be represented by a vector of discrete properties aggregated to a unique system state. The discrete properties may represent the state of relevant sub-systems or components of the storage systems 303, including a timeline of events and alerts which are raised and cleared on the storage systems 303. FIG. 4, for example, shows a timeline 400 of the system state which is a function of the alerts which are raised and cleared on a particular system (e.g., one of the storage systems 301). A health score (HS) for a particular system may be derived by summing all values (e.g., numbers of raised and cleared alerts) in a system state vector. In particular, the system state before and after a corrective action was executed may be compared. The health state $HS(s_t)$ is considered an improvement of the health state $HS(s_s)$ if the health score of $s_t$ is higher than $s_s$, i.e., $HS(s_t)>HS(s_s)$. The system configuration for a given one of the storage systems 303 (e.g., storage system 303-1), may include a list of hardware and/or software modules (e.g., components, models, part numbers, etc. and their associated versions and update dates). The system configuration may also include relevant activities (e.g., as determined from log messages or other information) that occurred before recovery actions are taken (e.g., non-disruptive upgrade (NDU), firmware upgrade, field replacement unit (FRU), etc.), inventory data, etc. The EABR policy engines 330 may select corrective actions to take on the storage systems based at least in part on the system configuration information as well as the incident resolution steps specified in the matching EABR policies.

The machine learning engine 314 analyzes the information stored in the event and alert database 312 to derive new or refined EABR policies, with such new or refined EABR policies being stored in the EABR policy database 316. Each EABR policy includes a set of raised events or alerts that has one root cause event or alert, and specifies a set of incident resolutions steps (e.g., repair or remedial actions) to be performed to resolve the underlying issue causing the root cause event or alert. Advantageously, all events or alerts in the EABR policy other than the root cause event or alert can be ignored or masked (e.g., such that a user is not bombarded with large numbers of raised events or alerts which all relate to the same underlying issue). The EABR policy enforcement service 318 updates the EABR policy engines 330 of the storage systems 303 in the field (e.g., in response to new or refined EABR policies being pushed to the EABR policy database 316 based on the results of the machine learning performed by the machine learning engine 314). The EABR policy enforcement service 318 may continuously propagate or enforce the new or refined EABR policies (derived from the machine learning processing by the machine learning engine 314) to all the storage systems 303.

The machine learning engine 314 of the storage monitoring system 301 may implement a RL framework which utilizes a DT architecture. The DT architectures address RL as a sequence modeling problem, and use an autoregressive transformer to predict or identify the next optimal corrective action or set of actions given the previous states, actions and rewards so that it maximizes some reward function (e.g., reaching the best system state). The DT architecture can advantageously outperform older and more complicated RL architectures, and has an ability to generalize from low amounts of data (e.g., known trajectories) which is important in particular for an offline scenario.

Figure 5:
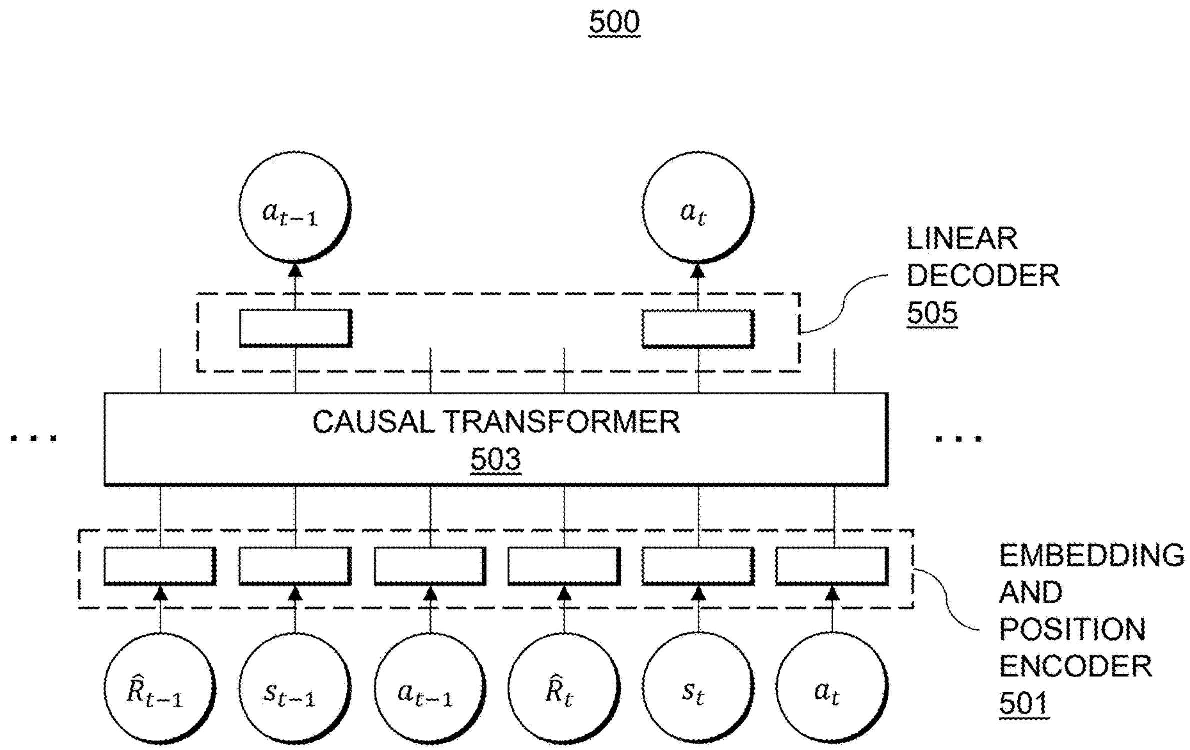
FIG. 5 shows a decision transformer architecture for a reinforcement learning framework in an illustrative embodiment.

FIG. 5 shows a DT architecture 500, which includes an embedding and position encoder 501, a causal transformer 503 and a linear decoder 505. The embedding and position encoder 501 takes as input sets of rewards (also referred to as returns), states and actions for times t−1, t, etc. The rewards or returns are denoted as $\hat{R}_{t-1}$, $\hat{R}_t$, etc. The states are denoted as $s_{t-1}$, $s_t$, etc. The actions are denoted as $a_{t-1}$, $a_t$, etc. The state is defined as the concatenation of the (mostly static) system configuration, the (dynamic) system state vector, and the last event or alert received. The action is defined as a corrective action that transitions the system state from an initial state $s_i$ to a final state $s_f$. The reward or return is defined as $HS(s_f)-HS(s_i)$, which is the (possibly zero) improvement in the system health as a result of the action. In a given state, following the reception of a new or unknown set of events or alerts, the machine learning algorithm can attempt one or multiple moves or actions. In the one-move approach, the system attempts to perform the relevant corrective actions one at a time until the system state is improved or the maximum number of attempts is exhausted. In the multiple moves approach, the system can perform sequences of actions, and in general the order of the attempted actions may affect the result (e.g., the final state).

Figure 6:
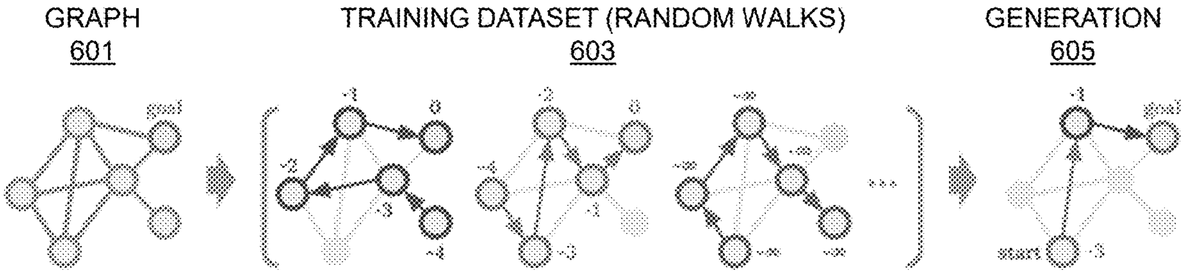
FIG. 6 shows training of a decision transformer architecture for a reinforcement learning framework in an illustrative embodiment.

An "online" approach is applicable when there is an ability to run experiments online (e.g., in RL terms, when the agent can interact with the environment). This is the case where there is a complete and accurate simulation of the system. In this case, a single corrective move or longer trajectories (e.g., sequences of corrective actions that will improve the system state as much as possible) may be looked at. For complex systems with many "moving parts" or components, the online scenario is unlikely to be available. An "offline" approach is applicable when only a limited set of experiments (e.g., offline RL) can be performed, and it is desired to generalize the subset of knowledge which is already possessed. The training dataset in this scenario may be generated from lab and QA experiments as well as field reports. FIG. 6 shows an offline approach 600, where a graph 601 with only a subset of the trajectories is known. The training dataset 603 includes random walks through the graph 601 which help to find good moves or actions that will improve the system state. The result is generation 605 of a policy (e.g., a move/action or a sequence of moves/actions which takes the system from the starting state to the end goal state). The goal of the DT algorithm is to generalize the subset of knowledge which is already known to find good moves/actions that will improve the system state. While it is possible to look for a sequence of moves/actions, given the uncertainty about the actual system behavior, the probability of error will increase as the length of the sequence of moves/actions increases.

An auto-learning process flow will now be described. One of the storage systems 303 (e.g., storage system 303-1) detects an unknown or new set of events and alerts (e.g., which does not match any of the EABR policies in its EABR policy engine 330-1). The upload service 310 of the storage monitoring system 301 gathers information from the storage system 303-1, and stores the information in the event and alert database 312. The machine learning engine 314 then analyzes the received data stored in the event and alert database 312 and attempts to find the optimal corrective action for the unknown or new set of events and alerts. If such an action is found, it is stored as a new or refined EABR policy in the EABR policy database 316. The EABR policy enforcement service 318 then updates the logic of the EABR policy engines 330 of all of the relevant storage systems 303. In addition, feedback regarding the success rate of existing EABR policies is recorded to gain confidence in the recommended EABR policy rules (e.g., stored in the EABR policy database 316).

The technical solutions described herein may be used to improve issue remediation in distributed storage systems, such as by streamlining the event or alert log analysis with faster pattern matching. The technical solutions are further able to provide improvements in identifying the causes of issues occurring on distributed storage systems, and for determining actions to take to resolve the issues. Such information may be integrated into event or alert notification mechanisms to provide users with more accurate information (e.g., root cause events or alerts for groups of events or alerts raised on a distributed storage system), which can reduce costs through avoiding support calls, automating repair or other corrective actions, etc. Thus, the technical solutions can be integrated with auto-remediation mechanisms inside components of a distributed storage system (e.g., to handle issues automatically without user intervention).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for machine learning-based generation of alert bundle self-healing policies for sets of alerts encountered on storage systems will now be described in greater detail with reference to FIGS. 7 and 8. Although described in the context of system 100, these platforms may also be used to implement at least portions of other information processing systems in other embodiments.

Figure 7:
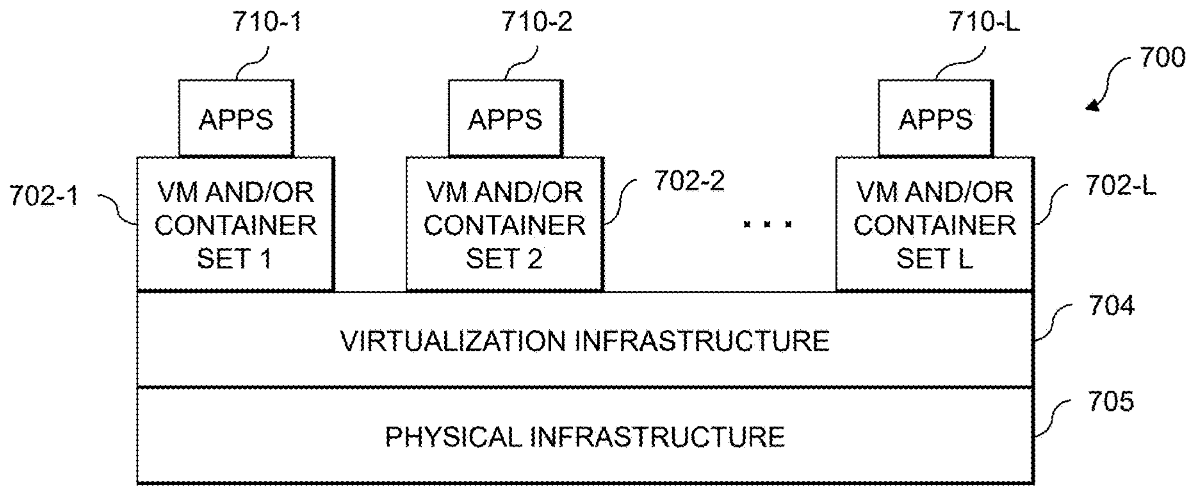
FIGS. 7 and 8 show examples of processing platforms that may be utilized to implement at least a portion of an information processing system in illustrative embodiments.
Figure 8:
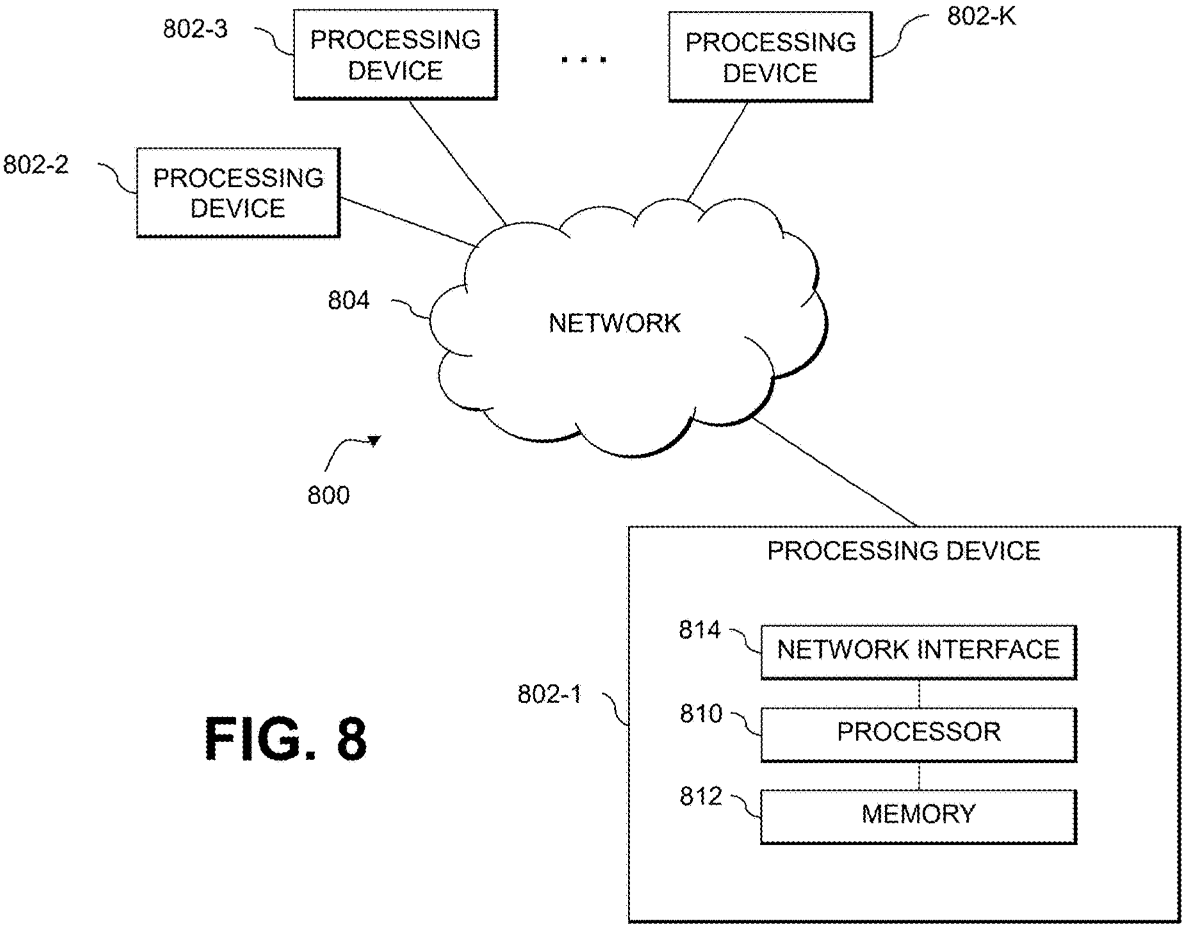

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for machine learning-based generation of alert bundle self-healing policies for sets of alerts encountered on storage systems as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to determine information characterizing a plurality of alerts detected on a set of two or more storage systems, the determined information characterizing (i) times at which the plurality of alerts are at least one of raised and cleared on the set of two or more storage systems, (ii) times at which one or more recovery actions are taken on the set of two or more storage systems, and (iii) system state information for respective ones of the storage systems in the set of two or more storage systems before and after the one or more recovery actions;

to generate, utilizing one or more machine learning algorithms that take as input at least a portion of the determined information, an alert bundle self-healing policy for a given set of two or more alerts in the plurality of alerts, the alert bundle self-healing policy identifying a root cause alert in the given set of two or more alerts and at least one recovery action to take in response to the root cause alert to remediate the given set of two or more alerts;

to provision at least one or more portions of the alert bundle self-healing policy in storage controllers of each of the two or more storage systems;

to detect, by a given storage controller of a given one of the two or more storage systems, a given instance of the root cause alert; and to perform, by the given storage controller, the at least one recovery action identified in the alert bundle self-healing policy in response to detecting the given instance of the root cause alert.

2. The apparatus of claim 1 wherein the alert bundle self-healing policy, when triggered, replaces reporting of the given set of two or more alerts with reporting of the root cause alert only.

3. The apparatus of claim 1 wherein the alert bundle self-healing policy specifies a window of time, wherein reporting of ones of the given set of two or more alerts raised in the specified window of time, other than the root cause alert, are masked.

4. The apparatus of claim 1 wherein the given set of two or more alerts is determined based at least in part on identifying which of the plurality of alerts are cleared within a predefined window of time following the at least one recovery action that remediates the root cause alert.

5. The apparatus of claim 4 wherein the given set of two or more alerts excludes one or more alerts in the plurality of alerts which are raised during the predefined window of time and which are not cleared within the predefined window of time following the at least one recovery action that remediates the root cause alert.

6. The apparatus of claim 1 wherein the root cause alert for the alert bundle self-healing policy is determined based at least in part on incident analysis for a set of support tickets generated by the set of two or more storage systems.

7. The apparatus of claim 1 wherein at least a subset of the plurality of alerts are not associated with any existing alert bundle self-healing policies configured in the storage controllers of the set of two or more storage systems.

8. The apparatus of claim 1 wherein the alert bundle self-healing policy comprises a new alert bundle self-healing policy.

9. The apparatus of claim 1 wherein the alert bundle self-healing policy comprises a modification of an existing alert bundle self-healing policy configured in the storage controllers of the set of two or more storage systems.

10. The apparatus of claim 1 wherein the system state information comprises a vector of discrete properties characterizing health of the set of two or more storage systems.

11. The apparatus of claim 10 wherein the vector of discrete properties specifies numbers of the plurality of alerts which are at least one of raised and cleared on respective ones of the storage systems in the set of two or more storage systems.

12. The apparatus of claim 1 wherein the one or more machine learning algorithms comprise a reinforcement learning framework utilizing a decision transformer architecture.

13. The apparatus of claim 12 wherein the decision transformer architecture is trained utilizing a random walk through one or more known sub-graphs characterizing transitions between system states as a result of recovery actions taken to bring storage systems from a starting state to a goal state.

14. The apparatus of claim 12 wherein the reinforcement learning framework utilizes a reward determined based at least in part on a difference in a health of the set of two or more storage systems determined by comparing the system state information before and after the one or more recovery actions to generate the alert bundle self-healing policy.

15. A computer program product comprising a non-transitory processor-readable storage medium having stored therein program code of one or more software programs, wherein the program code when executed by at least one processing device causes the at least one processing device:

to determine information characterizing a plurality of alerts detected on a set of two or more storage systems, the determined information characterizing (i) times at which the plurality of alerts are at least one of raised and cleared on the set of two or more storage systems, (ii) times at which one or more recovery actions are taken on the set of two or more storage systems, and (iii) system state information for respective ones of the storage systems in the set of two or more storage systems before and after the one or more recovery actions;

to generate, utilizing one or more machine learning algorithms that take as input at least a portion of the determined information, an alert bundle self-healing policy for a given set of two or more alerts in the plurality of alerts, the alert bundle self-healing policy identifying a root cause alert in the given set of two or more alerts and at least one recovery action to take in response to the root cause alert to remediate the given set of two or more alerts;

to provision at least one or more portions of the alert bundle self-healing policy in storage controllers of each of the two or more storage systems;

to detect, by a given storage controller of a given one of the two or more storage systems, a given instance of the root cause alert; and to perform, by the given storage controller, the at least one recovery action identified in the alert bundle self-healing policy in response to detecting the given instance of the root cause alert.

16. The computer program product of claim 15 wherein the alert bundle self-healing policy specifies a window of time, wherein reporting of ones of the given set of two or more alerts raised in the specified window of time, other than the root cause alert, are masked.

17. The computer program product of claim 15 wherein the given set of two or more alerts is determined based at least in part on identifying which of the plurality of alerts are cleared within a predefined window of time following the at least one recovery action that remediates the root cause alert.

18. A method comprising:

determining information characterizing a plurality of alerts detected on a set of two or more storage systems, the determined information characterizing (i) times at which the plurality of alerts are at least one of raised and cleared on the set of two or more storage systems, (ii) times at which one or more recovery actions are taken on the set of two or more storage systems, and (iii) system state information for respective ones of the storage systems in the set of two or more storage systems before and after the one or more recovery actions;

generating, utilizing one or more machine learning algorithms that take as input at least a portion of the determined information, an alert bundle self-healing policy for a given set of two or more alerts in the plurality of alerts, the alert bundle self-healing policy identifying a root cause alert in the given set of two or more alerts and at least one recovery action to take in response to the root cause alert to remediate the given set of two or more alerts;

provisioning at least one or more portions of the alert bundle self-healing policy in storage controllers of each of the two or more storage systems;

detecting, by a given storage controller of a given one of the two or more storage systems, a given instance of the root cause alert; and performing, by the given storage controller, the at least one recovery action identified in the alert bundle self-healing policy in response to detecting the given instance of the root cause alert;

wherein the method is performed by at least one processing device comprising a processor coupled to a memory.

19. The method of claim 18 wherein the alert bundle self-healing policy specifies a window of time, wherein reporting of ones of the given set of two or more alerts raised in the specified window of time, other than the root cause alert, are masked.

20. The method of claim 18 wherein the given set of two or more alerts is determined based at least in part on identifying which of the plurality of alerts are cleared within a predefined window of time following the at least one recovery action that remediates the root cause alert.

* * * * *